(12) United States Patent
Belleschi et al.

(10) Patent No.: US 11,212,058 B2
(45) Date of Patent: Dec. 28, 2021

(54) COMMAND ACKNOWLEDGMENT IN A WIRELESS COMMUNICATION SYSTEM

(71) Applicant: Telefonaktiebolaget LM Ericsson (publ), Stockholm (SE)

(72) Inventors: Marco Belleschi, Solna (SE); Mattias Bergström, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 47 days.

(21) Appl. No.: 16/632,725

(22) PCT Filed: Aug. 9, 2018

(86) PCT No.: PCT/SE2018/050805
§ 371 (c)(1),
(2) Date: Jan. 21, 2020

(87) PCT Pub. No.: WO2019/032029
PCT Pub. Date: Feb. 14, 2019

(65) Prior Publication Data
US 2021/0152315 A1    May 20, 2021

Related U.S. Application Data (60) Provisional application No. 62/544,350, filed on Aug. 11, 2017.

(51) Int. Cl.
*H04L 5/00* (2006.01)
*H04W 48/14* (2009.01)
(Continued)

(52) U.S. Cl.
CPC .......... *H04L 5/0055* (2013.01); *H04W 48/14* (2013.01); *H04W 48/16* (2013.01); *H04W 72/0406* (2013.01)

(58) Field of Classification Search
None
See application file for complete search history.

(56) References Cited

U.S. PATENT DOCUMENTS 9,191,161 B2 * 11/2015 Li .................. H04L 1/1635
9,504,032 B2 * 11/2016 Wang ............. H04W 72/0446
(Continued)

FOREIGN PATENT DOCUMENTS

WO    2016041203 A1    3/2016
WO    2017078128 A1    5/2017
(Continued)

*Primary Examiner* — Hong S Cho
(74) *Attorney, Agent, or Firm* — Sage Patent Group (57) ABSTRACT

A user equipment (105), UE, is configured for use in a wireless communication system (100). The UE (105) acknowledges one or more first commands received from an access node (110) by transmitting, to the access node (110), a first acknowledgment comprising a confirmation field set to a first value. After acknowledging the one or more first commands, the UE (105) acknowledges one or more second commands received from the access node (110) by selectively transmitting or refraining from transmitting, to the access node (110), a second acknowledgement comprising the confirmation field set to a second value depending respectively on whether or not the second value would be different from the first value.

18 Claims, 8 Drawing Sheets

400

ACKNOWLEDGING ONE OR MORE FIRST COMMANDS RECEIVED FROM AN ACCESS NODE BY TRANSMITTING, TO THE ACCESS NODE, A FIRST ACKNOWLEDGMENT COMPRISING A CONFIRMATION FIELD SET TO A FIRST VALUE
410

AFTER ACKNOWLEDGING THE ONE OR MORE FIRST COMMANDS, ACKNOWLEDGING ONE OR MORE SECOND COMMANDS RECEIVED FROM THE ACCESS NODE BY SELECTIVELY TRANSMITTING OR REFRAINING FROM TRANSMITTING, TO THE ACCESS NODE, A SECOND ACKNOWLEDGEMENT COMPRISING THE CONFIRMATION FIELD SET TO A SECOND VALUE DEPENDING RESPECTIVELY ON WHETHER OR NOT THE SECOND VALUE WOULD BE DIFFERENT FROM THE FIRST VALUE
420

(51) Int. Cl.
*H04W 48/16* (2009.01)
*H04W 72/04* (2009.01)
*H04L 1/16* (2006.01)

(56) References Cited

U.S. PATENT DOCUMENTS

2010/0070816 A1   3/2010   Park et al.
2015/0341858 A1   11/2015  Hwang et al.
2015/0349941 A1   12/2015  Papasakellariou et al.
2017/0150493 A1*  5/2017   Seok .................... H04B 7/0452
2018/0294927 A1   10/2018  Takeda et al.

FOREIGN PATENT DOCUMENTS

WO   2018174770 A1   9/2018
WO   2010088680 A1   8/2020

\* cited by examiner

COMMAND ACKNOWLEDGMENT IN A WIRELESS COMMUNICATION SYSTEM

RELATED APPLICATIONS

This application claims priority to U.S. Provisional Patent Application Ser. No. 62/544,350, filed 11 Aug. 2017, the entire contents of which are herein incorporated by reference.

TECHNICAL FIELD

The present disclosure generally relates to the field of wireless communication networks, and more particularly relates to signaling schemes useful for acknowledging one or more commands received from a remote device.

BACKGROUND

In wireless communication networks, there may be a number of situations in which a base station (e.g., eNB, gNB) provides a User Equipment (UE) with certain commands, the reception of which the UE is required to confirm/acknowledge. For example, the base station may rely on these acknowledgements to determine whether or not to retransmit the commands. For purposes of this disclosure, an acknowledgement may also be referred to as a confirmation (e.g., acknowledging receipt of a command may alternatively be referred to as confirming receipt of a command, and vice versa).

SUMMARY

Embodiments of the present disclosure include various methods, apparatus, systems, computer readable media, computer program products, and/or carriers. In general, such embodiments relate to signaling schemes useful for acknowledging one or more commands received from a remote device.

Particular embodiments include a method performed by a UE. The UE is configured for use in a wireless communication system. The method comprises acknowledging one or more first commands received from an access node by transmitting, to the access node, a first acknowledgment comprising a confirmation field set to a first value. The method further comprises, after acknowledging the one or more first commands, acknowledging one or more second commands received from the access node by selectively transmitting or refraining from transmitting, to the access node, a second acknowledgement comprising the confirmation field set to a second value depending respectively on whether or not the second value would be different from the first value.

In some embodiments, acknowledging the one or more first commands and acknowledging the one or more second commands is performed at respective acknowledgement transmission opportunities granted by the access node.

In some embodiments, the method further comprises toggling one or more bits of the confirmation field responsive to receiving each of the first and second commands.

In some embodiments, at least one of the first and second commands is a command to activate or release an operating configuration specifying a set of transmission parameters for communication. In some such embodiments, the operating configuration specifies a set of periodic radio resources for uplink communication.

In some embodiments, transmitting the first acknowledgement comprises transmitting the first acknowledgement with the confirmation field set to zero, and selectively transmitting or refraining from transmitting the second acknowledgement comprises transmitting the second acknowledgement with the confirmation field set to one.

In some embodiments, the confirmation field is shared for confirming receipt of any command to activate or release any of multiple operating configurations in a specific cell. In some other embodiments, the confirmation field is shared for confirming receipt of any command to activate or release any of multiple operating configurations for a plurality of different cells.

In some embodiments, the confirmation field is a single bit field.

Other embodiments include a different method performed by a UE. The UE is configured for use in a wireless communication system. The method comprises receiving, from an access node, an indication of a number of commands that will be transmitted from the access node to the UE. The method further comprises selectively transmitting or refraining from transmitting an acknowledgement message to the access node depending respectively on whether or not the UE receives the indicated number of commands within a downlink time interval to which the indication of the number of commands applies.

In some embodiments, the method further comprises receiving at least one command to activate or release an operating configuration specifying a set of transmission parameters for communication. In some such embodiments, the operating configuration specifies a set of periodic radio resources for uplink communication.

In some embodiments, the acknowledgement message comprises a confirmation field that is shared for confirming receipt of any command to activate or release any of multiple operating configurations in a specific cell. In some other embodiments, the acknowledgement message comprises a confirmation field that is shared for confirming receipt of any command to activate or release any of multiple operating configurations for a plurality of different cells. In some embodiments of either case, the confirmation field is set to zero or one based on a number of commands received within the downlink time interval. Additionally or alternatively, according to embodiments, the confirmation field is a single bit field.

In some embodiments, the indication of the number of commands is received in radio resource control (RRC) signaling.

In some embodiments, the indication of the number of commands is received in a medium access control (MAC) control element (CE).

In some embodiments, the indication of the number of commands is received in downlink control information.

Other embodiments include a method performed by an access node. The access node is configured for use in a wireless communication system. The method comprises transmitting, to a user equipment, UE, one or more first commands and subsequently one or more second commands. The method further comprises determining that the UE received the one or more first commands by receiving, from the UE, a first acknowledgement comprising a confirmation field set to a first value. The method further comprises determining that the UE received the one or more second commands by receiving or not receiving, from the UE, a second acknowledgement comprising the confirmation field set to a second value depending respectively on whether or not the second value would be different from the first value.

In some embodiments, at least one of the first and second commands is a command to activate or release an operating configuration specifying a set of transmission parameters for communication. In some such embodiments the operating configuration specifies a set of periodic radio resources for uplink communication.

In some embodiments, the confirmation field is shared for confirming receipt of any command to activate or release any of multiple operating configurations in a specific cell. In some other embodiments, the confirmation field is shared for confirming receipt of any command to activate or release any of multiple operating configurations for a plurality of different cells.

In some embodiments, the confirmation field is a single bit field.

In some embodiments, the first value is zero and the second value is one.

Yet other embodiments include a different method performed by an access node. The access node is configured for use in a wireless communication system. The method comprises transmitting a first set of commands to a user equipment, UE, and receiving a first acknowledgement from the UE in response, the first acknowledgement comprising a confirmation field set to a first value. The method further comprises scheduling transmission of a second set of commands to the UE according to one or more rules that require the UE to respond with a second acknowledgement comprising the confirmation field set to a second value that is different from the first value.

In some embodiments, at least one of the first and second commands is a command to activate or release an operating configuration specifying a set of transmission parameters for communication. In some such embodiments the operating configuration specifies a set of periodic radio resources for uplink communication.

In some embodiments, the confirmation field is shared for confirming receipt of any command to activate or release any of multiple operating configurations in a specific cell. In some other embodiments, the confirmation field is shared for confirming receipt of any command to activate or release any of multiple operating configurations for a plurality of different cells.

In some embodiments, the confirmation field is a single bit field.

In some embodiments, the first value is zero and the second value is one.

Yet further embodiments include a UE configured for use in a wireless communication system. The UE is configured to acknowledge one or more first commands received from an access node by transmitting, to the access node, a first acknowledgment comprising a confirmation field set to a first value. The UE is further configured to, after acknowledging the one or more first commands, acknowledge one or more second commands received from the access node by selectively transmitting or refraining from transmitting, to the access node, a second acknowledgement comprising the confirmation field set to a second value depending respectively on whether or not the second value would be different from the first value.

In some embodiments, the UE comprises a processor and a memory, the memory containing instructions executable by the processor whereby the device is operative to configure the UE.

In some embodiments, the UE comprises a first acknowledging module configured to acknowledge the one or more first commands, and a second acknowledging module configured to acknowledge the one or more second commands.

In some embodiments, the UE is configured to perform one or more of the methods described above.

Yet further embodiments include another UE configured for use in a wireless communication system. The UE is configured to receive, from an access node, an indication of a number of commands that will be transmitted from the access node to the UE. The UE is further configured to selectively transmit or refrain from transmitting an acknowledgement message to the access node depending respectively on whether or not the UE receives the indicated number of commands within a downlink time interval to which the indication of the number of commands applies.

In some embodiments, the UE comprises a processor and a memory, the memory containing instructions executable by the processor whereby the device is operative to configure the UE.

In some embodiments, the UE comprises a receiving module configured to receive the indication of the number of commands, and a transmitting module configured to selectively transmit or refrain from transmitting the acknowledgement message to the access node.

In some embodiments, the UE is configured to perform one or more of the methods described above.

Yet further embodiments include an access node configured for use in a wireless communication system. The access node is configured to transmit, to a UE, one or more first commands and subsequently one or more second commands. The access node is further configured to determine that the UE received the one or more first commands by receiving, from the UE, a first acknowledgement comprising a confirmation field set to a first value. The access node is further configured to determine that the UE received the one or more second commands by receiving or not receiving, from the UE, a second acknowledgement comprising the confirmation field set to a second value depending respectively on whether or not the second value would be different from the first value.

In some embodiments, the access node comprises a processor and a memory, the memory containing instructions executable by the processor whereby the device is operative to configure the access node.

In some embodiments, the access node comprises a transmitting module configured to transmit, to the UE, the one or more first commands and subsequently the one or more second commands, a first determining module configured to determine that the UE received the one or more first commands, and a second determining module configured to determine that the UE received the one or more second commands.

In some embodiments, the access node is configured to perform one or more of the methods described above.

Yet further embodiments include another access node configured for use in a wireless communication system. The access node is configured to transmit a first set of commands to a UE, and receive a first acknowledgement from the UE in response, the first acknowledgement comprising a confirmation field set to a first value. The access node is further configured to schedule transmission of a second set of commands to the UE according to one or more rules that require the UE to respond with a second acknowledgement comprising the confirmation field set to a second value that is different from the first value.

In some embodiments, the access node comprises a processor and a memory, the memory containing instructions executable by the processor whereby the device is operative to configure the access node.

In some embodiments, the access node comprises an interfacing module configured to transmit the first set of commands and receive the first acknowledgement from the UE in response, and a scheduling module configured to schedule the transmission of the second set of commands.

In some embodiments, the access node is configured to perform one or more of the methods described above.

Yet further embodiments include a computer program, comprising instructions which, when executed on at least one processor of a network device, cause the at least one processor to carry out any of the methods described above.

Yet further embodiments include a carrier containing such a computer program, the carrier being one of an electronic signal, optical signal, radio signal, or computer readable storage medium.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter generally, whereas discussion of a specific instance of an illustrated element will append a letter designation thereto (e.g., discussion of an UE 105, generally, as opposed to discussion of particular instances of UEs 105a, 105b).

DETAILED DESCRIPTION

Figure 1:
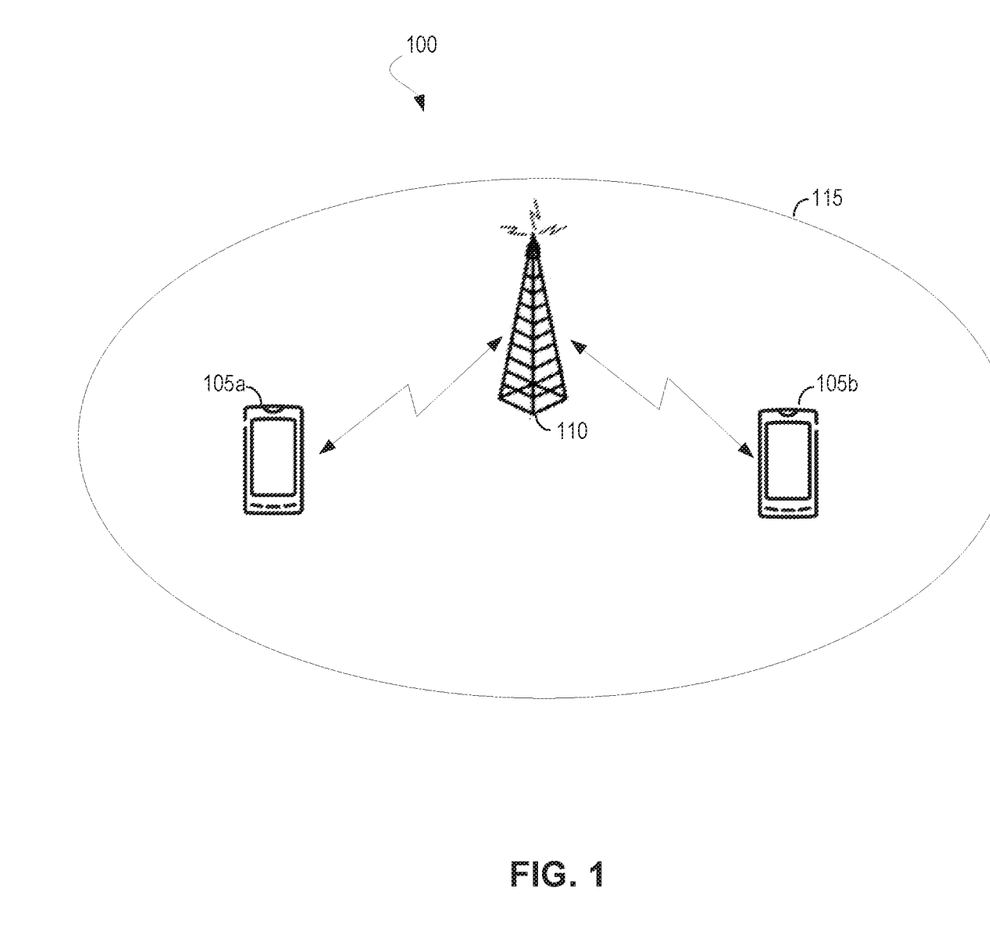
FIG. 1 is a block diagram illustrating an example of a wireless communication network, according to one or more embodiments of the present disclosure.

FIG. 1 illustrates an example communication system 100 according to one or more embodiments of the present disclosure. Although certain aspects of the communication system 100 may herein be described in the context of a Long-Term Evolution (LTE) communication network, the discussion throughout this disclosure may similarly be applied to other wireless communication systems and/or combinations thereof, including but not limited to 5G Next Radio (NR) and/or Wi-Fi.

The communication system 100 comprises a plurality of wireless communication nodes. One of the wireless communication nodes in particular is an access node 110 that serves a cell 115 to User Equipments (UEs) 105a-b. The UEs 105a-b and/or access node may, in some embodiments, each be referred to as a radio node (i.e., a network node capable of radio communication). Further, the access node 110 may be referred to, in some embodiments, as a base station (such as an eNB, gNB), for example. Although only one access node 110 and two UEs 105a-b are illustrated in FIG. 1, other examples of the communication system 100 may include any number of access nodes 110, each of which may serve one or more cells 115 to any number of UEs 105. Further, according to other embodiments, the UEs 105a-b may, instead, be base stations (e.g., femtocells, relay base stations).

Figure 2:
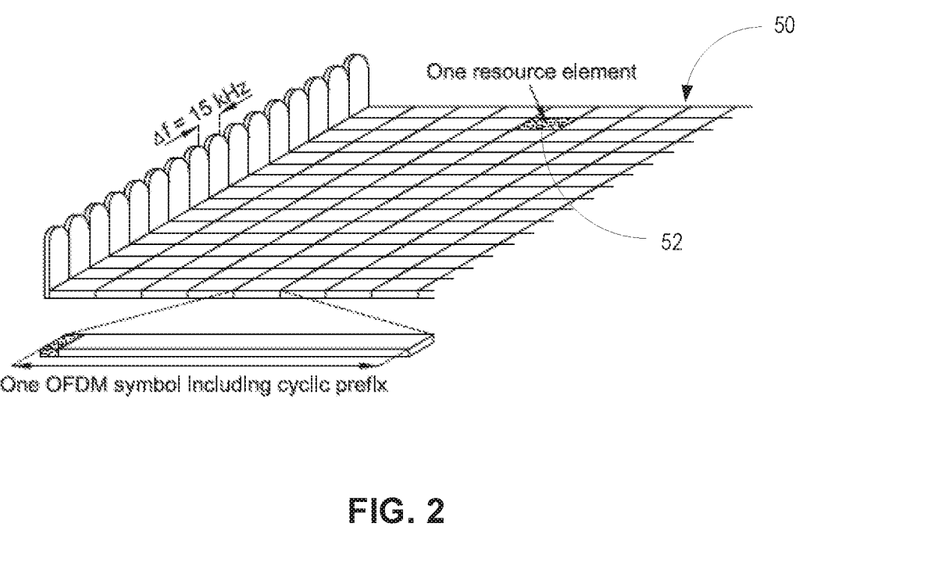
FIG. 2 is a block diagram illustrating an example time-frequency grid of physical resources used for wireless communication, according to one or more embodiments of the present disclosure.

Wireless communication between the access node 110 and each of the UEs 105a-b is performed using radio resources across a time domain, a frequency domain, or both. LTE in particular uses OFDM in the downlink and Discrete Fourier Transform (DFT) spread OFDM in the uplink. The basic LTE downlink physical resource can be viewed as a time-frequency grid. FIG. 2 illustrates a portion of an example OFDM time-frequency grid 50 for LTE. Generally speaking, the time-frequency grid 50 is divided into one millisecond subframes. Each subframe includes a number of OFDM symbols. For a normal cyclic prefix (CP) length, suitable for use in situations where multipath dispersion is not expected to be extremely severe, a subframe may comprise fourteen OFDM symbols. A subframe may comprise twelve OFDM symbols if an extended cyclic prefix is used. In the frequency domain, the physical resources shown in FIG. 2 are divided into adjacent subcarriers with a spacing of 15 kHz. The number of subcarriers may vary according to the allocated system bandwidth. The smallest element of the time-frequency grid 50 is typically referred to as a resource element, which comprises one OFDM subcarrier during one OFDM symbol interval.

Figure 3:
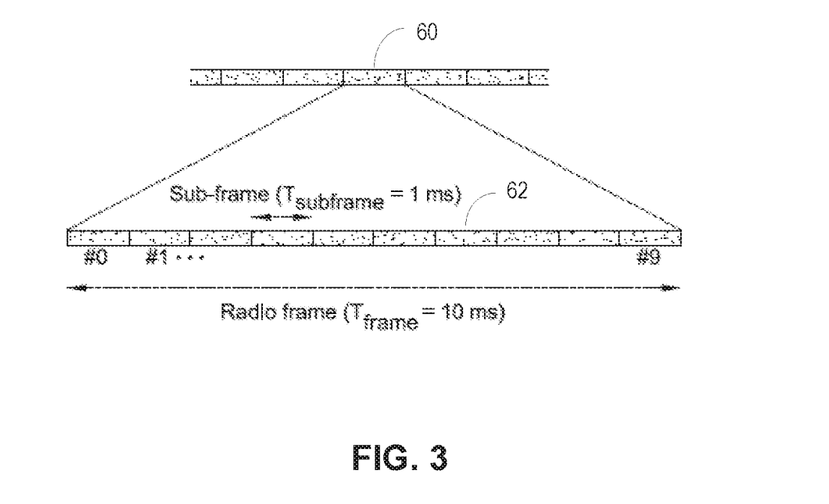
FIG. 3 is a block diagram illustrating an example radio frame, according to one or more embodiments of the present disclosure.

In LTE systems, data is transmitted to a UE 105 over a downlink transport channel known as the Physical Downlink Shared Channel (PDSCH). The PDSCH is a time and frequency multiplexed channel shared by a plurality of UEs 105. As shown in FIG. 3, the downlink transmissions are typically organized into ten millisecond radio frames 60. Each radio frame typically comprises ten equally-sized subframes 62. For purposes of scheduling users to receive downlink transmissions, the downlink time-frequency resources are allocated in units called resource blocks (RBs). Each resource block typically spans twelve subcarriers (which may be adjacent or distributed across the frequency spectrum) and one 0.5 ms slot (one half of one subframe).

Within a cell 115 the access node 110 may dynamically schedule downlink transmissions to and/or uplink transmissions from one or more of the UEs 105*a-b*, according to one or more embodiments. For such dynamic scheduling, the scheduling node 110 may transmit downlink control information (DCI) in each subframe 62. The DCI identifies one or more UEs 105 that have been scheduled to receive data in the current downlink subframe 62 and the resource blocks on which the data is being transmitted to the scheduled radio nodes 105. The DCI is typically transmitted on the Physical Downlink Control Channel (PDCCH), e.g., in the first two, three, or four OFDM symbols in each subframe 62. The resources on which the data is carried is typically transmitted in a corresponding Physical Downlink Shared Channel (PDSCH).

The access node 110 may additionally or alternatively perform semi-persistent scheduling (SPS) of the downlink and/or uplink, according to one or more embodiments. SPS generally requires less signaling overhead than dynamic scheduling. For SPS scheduling, the resource blocks on which data is being transmitted to one or more radio nodes 105 is not identified in DCI transmitted in each subframe 62 (as is the case in dynamic scheduling). Rather, the resource blocks may be identified in DCI transmitted in a particular subframe 62 for multiple subframes (e.g., the present subframe and one or more subsequent subframes). According to one or more embodiments, the multiple subframes may be contiguous or discontiguous. The spacing between subframe occasions to which the DCI applies may, in some embodiments, be a periodicity of the SPS. This SPS period may be expressed in terms of time (e.g., every 10 milliseconds) and/or in terms of subframes (e.g., every tenth subframe). According to embodiments, this period may be adapted by the access node 110, e.g., by appropriate signaling as will be discussed below. Further, this period may be of a duration that is less than, equal to, or greater than the duration of a radio frame 60, according to various embodiments.

According to embodiments, the access node 110 may freely switch between dynamic scheduling and SPS, and may configure one or more UEs 105 accordingly (e.g., via Radio Resource Control (RRC) signaling to indicate that SPS of a particular periodicity is to be used). Thereafter, the access node 110 may send a command (e.g., in DCI) to a UE 105 to activate SPS. The UE 105 may store this DCI and expect a downlink transmission at each SPS occasion accordingly. Similarly, the access node 110 may send a command (e.g., in DCI) to a UE 105 to release the UE 105 from this SPS configuration.

The UE 105 may, in some embodiments, acknowledge a previously received command (e.g., an activation command, a release command, a reactivation command). Such embodiments may include, for example, the network 100 sending (e.g., via an access node 110 to the UE 105) an activation or deactivation command for cellular operations in different cells 115, e.g., to indicate that the UE 105 should start or stop using a certain cell 115, or to indicate that SPS or other cellular features should or should not be used on a certain cell 115. For example, the network may send SPS activation and/or release commands to the UE 105 to activate and/or release certain SPS configurations in certain cells 115.

Other embodiments may include, for example, the network 100 sending (e.g., via the access node 110 to the UE 105) activation and/or deactivation commands for certain operating configurations previously provided by the network 100. In particular, each of these operating configurations may correspond to a different set of transmitting parameters including, e.g., time/frequency resource(s), Modulation and Coding Scheme (MCS), power, Hybrid Automatic Repeat reQuest (HARQ) configuration(s), beam configuration(s), antenna configuration(s), etc. Accordingly, each of these operating configurations may be addressed by a configuration index. In this case, the network 100 may need to specifically address the operating configuration via its related index in order to activate and/or release it and the UE 105 may need to acknowledge the correct reception of the command pertaining to the indicated configuration. According to a particular example, a first operating configuration may include a specific SPS configuration, whereas a second operating configuration may include a pool of time resources represented by a bitmap in which each bit indicates whether a certain subframe may be used by the UE 105 for transmission.

One example in which the UE 105 may acknowledge a command may be by toggling a certain signaled bit between 0 and 1 whenever a command requiring acknowledgement is received. For example, the UE 105 may support transmission of an acknowledgement message that comprises a confirmation field comprising one or more bits. Each of the bits may, in some embodiments, correspond to a cell and/or type of setting that is configurable by the access node 110. According to one example in which each bit corresponds to a respective cell, the UE may acknowledge a command from the access node 110 that activates or deactivates an operating configuration in a given cell 115 by transmitting an acknowledgement message in which the bit of the confirmation field that corresponds to the given cell 115 is toggled (e.g., as compared to the value of that bit as transmitted in a previous acknowledgement message). Such an acknowledgement message may inform the access node 110 that the command has been correctly received for the given cell 115.

According to other embodiments, each of the bits may correspond to a respective operating configuration. In such an example, the UE 105 may acknowledge a command from the access node 110 that activates or deactivates a given operating configuration by transmitting an acknowledgement message in which the bit of the confirmation field that corresponds to the given operating configuration is toggled (e.g., as compared to the value of that bit as transmitted in a previous acknowledgement message). Such an acknowledgement message may inform the network that the command has been correctly received for the given cell 115.

In certain embodiments, the bit toggling mechanism discussed above may result in ambiguity with respect to what exactly was intended to be acknowledged by the UE 105. For example, the access node 110 may attempt to simultaneously activate and/or release a set of two operating configurations with respect to a given cell 115 (e.g., in the same DCI). The UE 105, using the above-discussed bit toggling mechanism to acknowledge commands, may first toggle the bit of the confirmation field corresponding to the given cell from 0 to 1 and then again from 1 to 0 before sending the acknowledgement message, thereby leading to ambiguity with respect to whether the 0 value indicates that both commands were received, or that neither of the commands were received. In other words, according to this example, if an acknowledgement message is sent to the access node 110 including a 0 in the bit for the given cell 115, the access node 110 receiving this 0 bit may interpret the value of this bit as having not been toggled (e.g., because the activation and/or deactivation commands were not received). Similar problems may manifest when the access node 110 activates/releases other even numbers of operating configurations via corresponding commands when the UE 105 uses the above-discussed bit toggling acknowledgement scheme.

In a similar example, the access node 110 may attempt to simultaneously activate and/or release three operating configurations with respect to a given cell 115. In such an example, the UE 105, using the above-discussed bit toggling mechanism to acknowledge commands, may first toggle the bit for a given cell 115 from 0 to 1 for the first operating configuration, then from 1 to 0 for the second operating configuration, and finally from 0 to 1 for the third operating configuration before sending the acknowledgement message. The access node 110, receiving a value of 1 for the bit corresponding to the given cell 115 in the confirmation field of the acknowledgment message may not be able to determine whether only one of the commands was correctly received or whether all three were correctly received. Further, if the 1 bit is intended to indicate that only one command was correctly received, the access node 110 may not be able to determine which of the three commands was correctly received (and correspondingly, which of the three operating configurations the UE 105 intends to activate and/or release). Similar problems may manifest when the access node 110 activates and/or releases other odd numbers of operating configurations via corresponding commands when the UE 105 uses the above-discussed bit toggling acknowledgement scheme.

Particular embodiments of the present disclosure resolve or avoid the above discussed ambiguity in the acknowledgement messages transmitted by a UE 105 in response to receiving one or more commands for operation in different cells and/or for different operating configurations. Particular embodiments include various methods to determine whether to transmit or refrain from transmitting an acknowledgement message in which once at least one bit is toggled more than once in the acknowledgement message, for example. Other embodiments schedule transmission of commands in accordance with one or more rules that require the UE 105 to transmit acknowledgements that have their confirmation fields set to different values.

Figure 4:
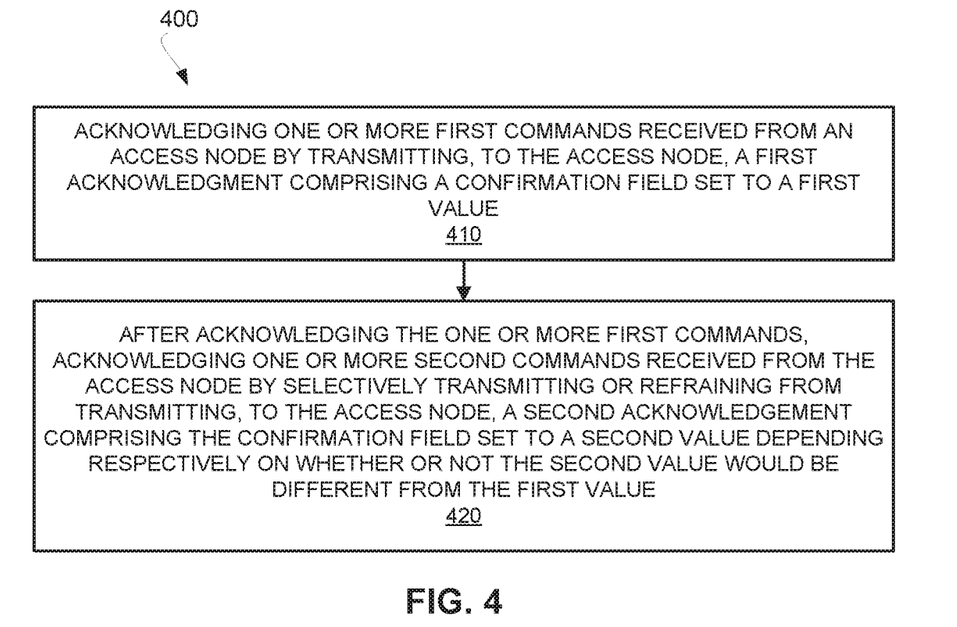
FIG. 4 is a flow diagram illustrating an example method, according to one or more embodiments of the present disclosure.

One particular embodiment of the present disclosure includes the method 400 illustrated in FIG. 4. The method 400 is performed by a UE 105 configured for use in a wireless communication system 100. The method 400 comprises acknowledging one or more first commands received from an access node 110 by transmitting, to the access node 110, a first acknowledgment comprising a confirmation field set to a first value (block 410). The method further comprises, after acknowledging the one or more first commands, acknowledging one or more second commands received from the access node 110 by selectively transmitting or refraining from transmitting, to the access node 110, a second acknowledgement comprising the confirmation field set to a second value depending respectively on whether or not the second value would be different from the first value (block 420).

Figure 5:
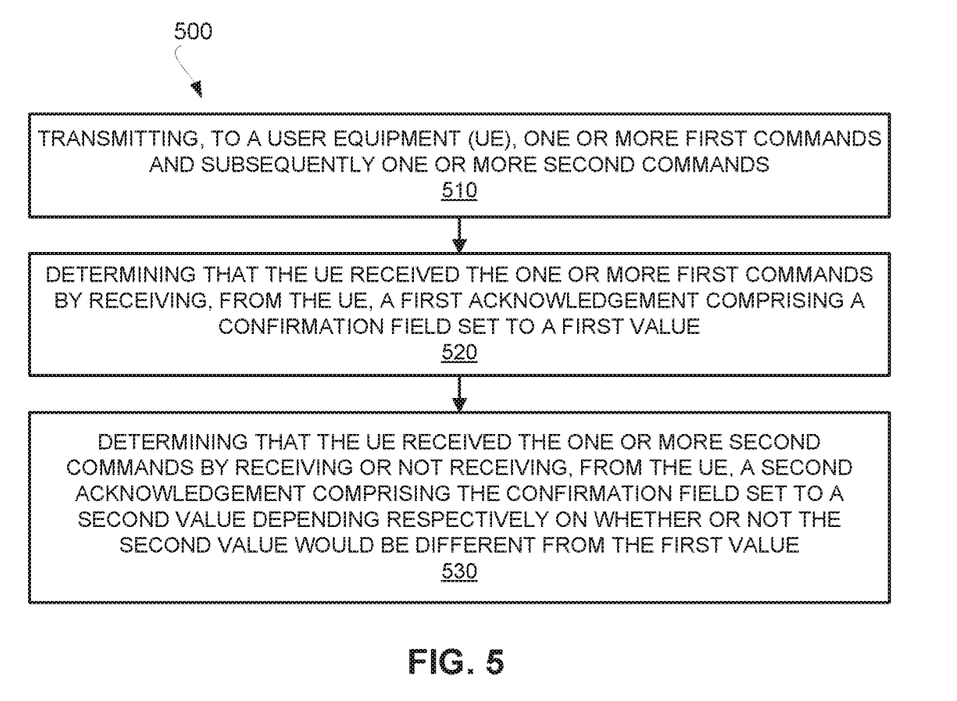
FIG. 5 is a flow diagram illustrating another example method, according to one or more embodiments of the present disclosure.

Another particular embodiment of the present disclosure includes the method 500 illustrated in FIG. 5. The method 500 is performed by an access node 110 configured for use in a wireless communication system 100. The method 500 comprises transmitting, to a UE 105, one or more first commands and subsequently one or more second commands (block 510). The method 500 further comprises determining that the UE 105 received the one or more first commands by receiving, from the UE 105, a first acknowledgement comprising a confirmation field set to a first value (block 520). The method 500 further comprises determining that the UE 105 received the one or more second commands by receiving or not receiving, from the UE 105, a second acknowledgement comprising the confirmation field set to a second value depending respectively on whether or not the second value would be different from the first value (block 530).

Figure 6:
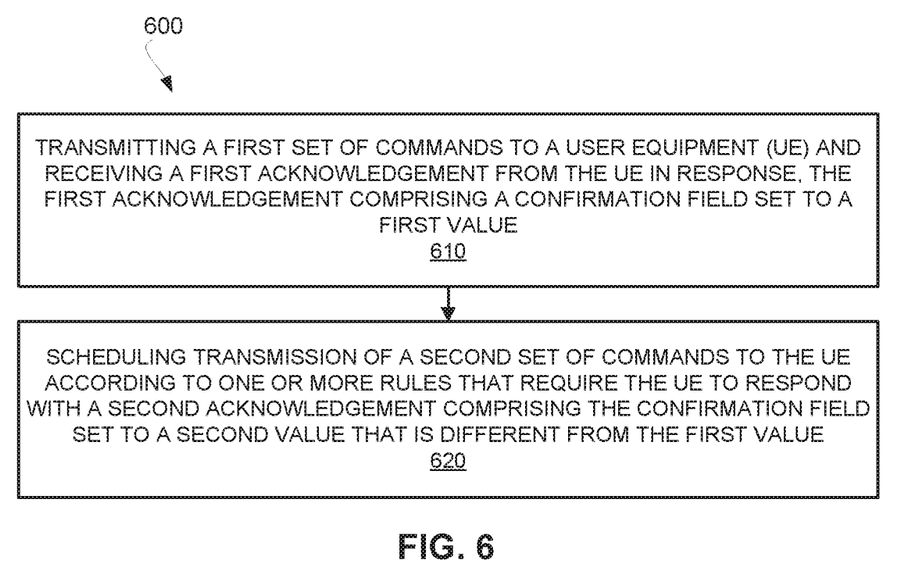
FIG. 6 is a flow diagram illustrating yet another example method, according to one or more embodiments of the present disclosure.

Yet another particular embodiment of the present disclosure includes the method 600 illustrated in FIG. 6. The method 600 is performed by an access node 110 configured for use in a wireless communication system 100. The method 600 comprises transmitting a first set of commands to a UE 105 and receiving a first acknowledgement from the UE 105 in response. The first acknowledgement comprises a confirmation field set to a first value. The method 600 further comprises scheduling transmission of a second set of commands to the UE 105 according to one or more rules that require the UE 105 to respond with a second acknowledgement comprising the confirmation field set to a second value that is different from the first value.

According to various embodiments, the UE 105 may deliver the acknowledgement message via RRC, Medium Access Control (MAC) (such as in a MAC Control Element (CE)), Physical Uplink Shared Channel (PUSCH), or Physical Uplink Control Channel (PUCCH), for example. The acknowledgement message includes some number of bits, each of which may, for example, represent a respective cell index. In such an embodiment, the value of a particular bit may indicate acknowledgement of a command (e.g., an activation command, a release command) pertaining to the corresponding cell.

Alternatively, each of the bits may represent, for example, the index of a given operating configuration. In such an embodiment, the value of a particular bit may indicate acknowledgement of a command pertaining to the corresponding operating configuration. An example of such an operating configuration may be a specific SPS configuration in which certain time/frequency resources are to be used by the UE 105 at periodic intervals. In another example, an operating configuration includes a pool of time resources represented by a bitmap in which each bit indicates whether a certain subframe can be used by the UE for transmission. The bitmap may be repeated periodically and may additionally, in some embodiments, be associated with a set of transmitting parameters (e.g., Physical Resource Blocks (PRBs), MCSs) to be used when the UE is allowed to transmit according to such bitmap.

In some embodiments, the UE 105 may autonomously perform actions (e.g., activation and/or release actions without direct intervention by the network 100) that the UE 105 may or may not indicate by acknowledgement message to the network 100. For example, in some embodiments, the UE 105 may receive an activation command and then a release command from the access node 110. In response, the UE 105 may omit transmission of an acknowledge indication (e.g., to avoid sending a twice-toggled bit in a confirmation field, as previously discussed). Alternatively, the UE 105 may send an acknowledgement message with particular content (e.g., depending on what the bits of the confirmation field represent in that particular embodiment). Notwithstanding, in other embodiments the UE 105 may receive an activation command from the access node 110 and autonomously release associated resources. In at least some such embodiments, the UE 105 may determine whether or not an acknowledgement message should be sent, and if so, what the acknowledgement message contains, e.g., in a manner similar to embodiments in which each of the actions is commanded by the network 100. According to other embodiments, the UE 105 may exclude autonomously performed actions from consideration for acknowledgement.

Figure 7A:
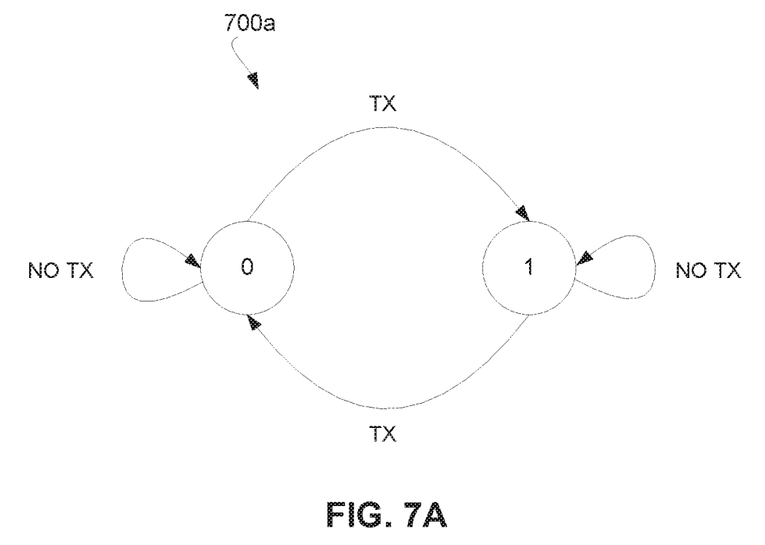
FIGS. 7A and 7B are state diagrams, each of which illustrates a respective example scheme for selectively transmitting or refraining from transmitting, according to one or more embodiments of the present disclosure.

FIG. 7A illustrates an example state diagram 700*a* consistent according to one or more embodiments of the present disclosure. The state diagram 700*a* represents the possible states of an acknowledgement bit, i.e., a zero or a one. The state diagram 700*a* further illustrates whether a UE 105 transmits an acknowledgement message at a given acknowledgement transmission opportunity depending on the state of the acknowledgement bit as compared to the last time the acknowledgement bit was transmitted. As shown, if the state of the acknowledgement bit has changed from 0 to 1, or from 1 to 0, the UE 105 transmits the acknowledgment message in the given acknowledgement transmission opportunity. Otherwise, the UE 105 refrains from transmitting the acknowledgement message in the given acknowledgement transmission opportunity. Acknowledgment transmission opportunities may, for example, be periodic and/or scheduled by the access node 110. Transmission opportunities according to various embodiments of the present disclosure will be discussed in further detail below.

The access node 110 may correspondingly expect or not expect an acknowledgement message from the UE 105 based on which commands the access node 110 has transmitted. That is, the access node 110 may determine that, for example, two commands pertaining to the same cell were both received by the UE 105 because no acknowledgement message was received in which the bit for that cell was toggled. Thus, the UE 105 may implicitly acknowledge receipt of the two commands by refraining from transmitting the acknowledgement message. Correspondingly, the access node 110 may determine that both commands were received because the access node 110 expects the UE 105 to refrain from transmitting an acknowledgement message when the commands to be acknowledged would cause a confirmation field in the appropriate acknowledgement message to revert to a previous state.

Figure 7B:
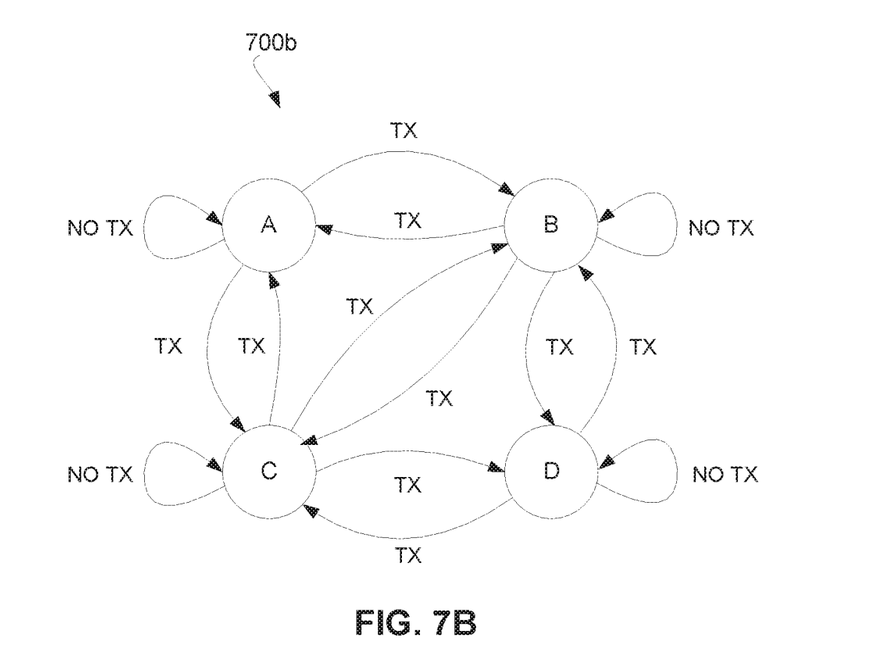

Although many of the embodiments described herein use a toggled bit-field (which can take two values) to acknowledge commands relating to a particular cell 115 and/or operating configuration, other embodiments may acknowledge commands using a field that can represent more than two values (e.g., a confirmation field in which different values represent respective states). For example, in some embodiments, a confirmation field supports four values (A, B, C and D) as illustrated in the state diagram 700*b* in FIG. 7B. As shown in the state diagram 700*b*, according to some embodiments, the UE 105 may refrain from transmitting an acknowledgement message if the value of the field to be included in the acknowledgement message represents the same state of the UE 105 prior to receiving the one or more commands to be acknowledged, according to particular embodiments. Accordingly, if the state of the UE 105 was B and the UE 105 performed a series of actions (which may have been triggered by one or more commands from the network 100) that caused the UE 105 to remain (or change from, and return to) state B, the UE may refrain from transmitting an acknowledgement message (e.g., similar to the example of FIG. 7A). Similar principles may apply with respect to the other examples described herein, when using a field that can represent more than two acknowledgement values, e.g., for a particular cell 115 and/or operating configuration.

In other words, if the state of the UE at a time T is A, and the UE 105 performs a set of actions (e.g., performing an activation of some resources such that the state of the UE 105 is B), the UE 105 may have the opportunity to transmit an indication of the state of the UE (i.e., B), e.g., using an acknowledgment message as described above. However, if the UE 105 has performed a series of actions such that the state of the UE is A again before the opportunity to transmit the indication of its state occurs (e.g. first performing an action such that the state of the UE 105 becomes B, and then performing another action such that the state of the UE becomes A again), the UE 105 may refrain from transmitting the acknowledgement message, as shown in the state diagram 700*b* of FIG. 7B.

In particular, in some radio systems (e.g., LTE and NR) the UE 105 may not be allowed to perform a transmission unless that transmission is requested from and/or granted by the network 100. In such cases, the UE's 105 transmissions may generally be under the control of the network 100. Accordingly, in some embodiments, upon having an opportunity to transmit (e.g., as granted by the access node 110), the UE 105 determines whether the state of the UE 105 is different as compared to the most recently reported state, and if so, the UE 105 transmits an acknowledgement message in which an indication of the UE's 105 state is provided. For example, if the UE 105 was initially in state B and the UE performed one or more actions resulting in that the UE was in state A, the UE would perform a transmission indicating that the UE's state is A (rather than B), e.g., to acknowledge the command(s) that caused the UE 105 to be in state A. Alternatively, if the UE 105 performed one or more actions which resulted in the UE 105 being in state B, the UE 105 would refrain from providing such an indication.

If the toggled bit represents the cell index, the above may happen for example when the network simultaneously sends more than one activation/release commands of multiple operating configurations for the same cell and the UE would need to toggle more than one time the bit corresponding to the cell index.

If the toggled bit represents an operating configuration index, the above may happen for example when the network simultaneously sends more than one activation/release commands of the same operating configurations in multiple cells and the UE would need to toggle more than one time the bit corresponding to the operating configuration index.

Particular embodiments above described a UE 105 that may, upon reception of a certain command, trigger transmission of an acknowledgement message in which a certain field is toggled or changed in value (i.e., as compared to the value of that field in a previous acknowledgement message). Particular embodiments further described that multiple commands may be acknowledged using an acknowledgement message in which a field is toggled or modified a corresponding number of times (e.g., toggled once per relevant command to be acknowledged). According to other embodiments, the UE 105 may refrain from transmitting the acknowledgement message if more than a threshold number of relevant commands require acknowledgement. This threshold number of relevant commands may be, in some embodiments, the same as the number of states supported by the relevant confirmation field. Thus, in some embodiments, a UE 105 using an acknowledgement scheme that uses bit toggling may refrain from transmitting an acknowledgment message responsive to receiving more than one command relevant to that bit. Other embodiments include a UE 105 that refrains from transmitting an acknowledgement message response to receiving more than a different number of commands relevant to a particular confirmation field.

Figure 8:
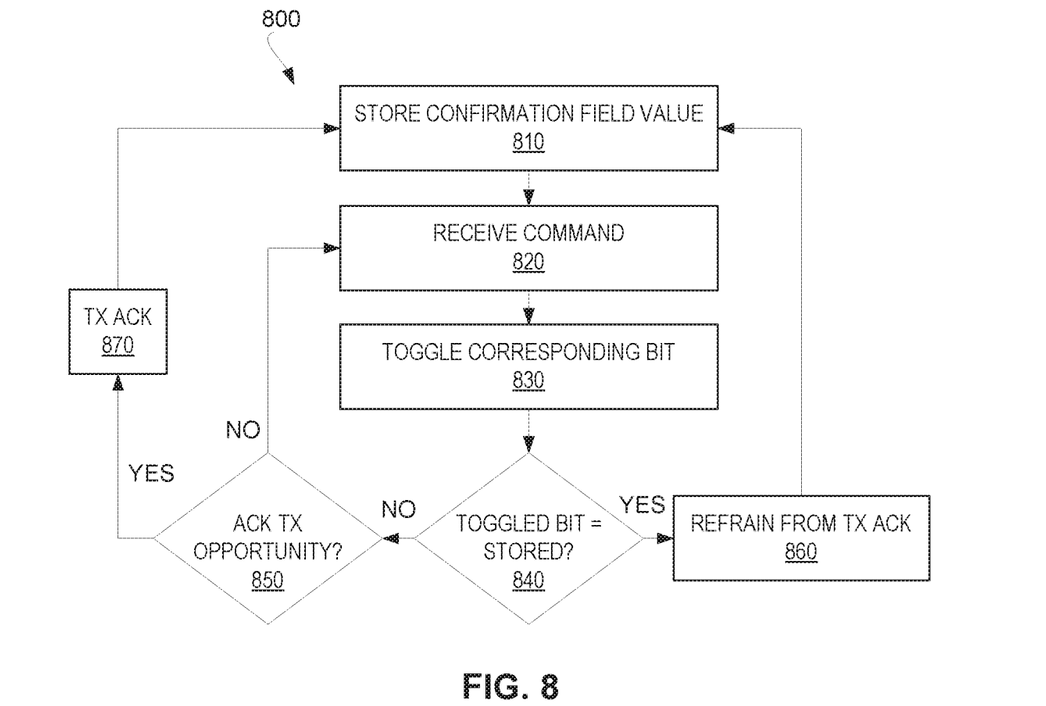
FIG. 8 is a flow diagram illustrating a yet further example method, according to one or more embodiments of the present disclosure.

Further, as previously discussed, the confirmation field according to some embodiments may comprise an array of independently configurable bit-fields (and/or multi-bit fields). In such an embodiment, each index of the array may be mapped to, e.g., a cell 115 or operating configuration. In some such embodiments, the UE 105 refrains from transmitting the acknowledgement message responsive to any number of the fields in the confirmation field toggling (or changing state) more than a threshold number of times. FIG. 8 illustrates an example process 800 in which a UE 105 uses an array of bit-fields as a confirmation field included in certain acknowledgment messages (i.e., when transmitted). Each bit-field in this example corresponds to a cell 115. As will be further explained, according to this example process 800, the UE 105 receives one or more commands relating to one or more cells 115, and transmits an acknowledgment message so long as not more than one command relevant to each cell 115 has been received since the last acknowledgement transmission opportunity. The process 800 begins with the UE 105 storing the value of its confirmation field (block 810). The UE 105 will later use this stored value as a basis for determining whether or not to transmit the acknowledgement message. The UE 105 then receives a command from an access node 110 (block 820). In response, the UE 105 toggles the bit corresponding to the cell to which the command relates (block 830). For example, if the command is to activate an operating configuration in cell A, the UE toggles the bit in the confirmation field corresponding to cell A.

The UE 105 determines whether the bit which was just toggled is equal to the value of that bit that was earlier stored (block 840). If the toggled bit has a value equal to the saved value of that bit (block 840, yes), the UE 105 refrains from transmitting an acknowledgement message at the next acknowledgement transmission opportunity (block 860) and begins the process again by storing the confirmation field value for determining whether or not to transmit an acknowledgement message in a subsequent transmission opportunity (block 810).

If the toggled bit is not the same as what was stored (block 840, no), the UE 105 determines whether an acknowledgement transmission opportunity has occurred (block 850). If not (block 850, no), the UE 105 receives the next command (block 820) and proceeds as described above, toggling the corresponding bit as appropriate (block 830) and so on.

If, however, an acknowledgement transmission opportunity has occurred (block 850, yes), the UE 105 transmits an acknowledgement message (block 870). The confirmation field in the acknowledgement message includes each of the bits that were toggled since the confirmation field value was last stored. The UE 105 then restarts the process 800 by storing the confirmation field value transmitted in the acknowledgement message for determining whether or not to transmit a further acknowledgement message in a subsequent transmission opportunity (block 810).

The UE 105 may refrain from transmitting an acknowledgement in a number of ways, depending on the embodiment. For example, to refrain from transmitting an acknowledgement message, the UE 105 may, for example, cancel transmission of a previously triggered acknowledgement message. Alternatively, the UE 105 may revert to a state previous to when transmitting the acknowledgment message was triggered. Thus, in some embodiments, refraining from transmitting may include the UE 105 taking certain steps towards preparing to transmit the acknowledgement message (e.g., by generating the acknowledgement message), but nonetheless refraining from signaling the acknowledgement message to the access node 110.

Many of the embodiments discussed above include the UE 105 acknowledging commands explicitly (e.g, by transmitting a particular acknowledgement message that is unambiguous for the circumstances) or implicitly (e.g., by refraining from transmitting an acknowledgement message in a manner that can be predicted by the access node 110). Other embodiments include the access node 110 scheduling the transmission of commands such that the UE 105 is not presented with having to transmit an ambiguous acknowledgement message. For example, the access node 110 may schedule the transmission of commands such that the UE 105 does not receive, within any acknowledgement period, more commands to acknowledge than there are states that can be signaled using the corresponding confirmation field. For example, if a bit-field is used for confirming commands pertaining to a given cell 115, the access node 110 may schedule no more than one command pertaining to that cell 115 per acknowledgement transmission opportunity. In this way, the UE 105 may, for example, transmit an acknowledgement message to acknowledge each command pertaining to that cell 115 using a single toggled bit. In such a scenario, the UE 105 would not encounter a situation in which it would need to toggle that cell's 115 bit more than one time per acknowledgement period. More generally, in some embodiments, the access node 110 may avoid sending commands within a given acknowledgement interval that would cause the UE to revert back to its most recently reported state. According to one particular example, the access node 110 may avoid sending, in the same PDCCH occasion, activation and/or release commands of different operating configurations for the same cell 115 (i.e., if the bits in the acknowledgement message refer to the cell indexes) or activation and/or release commands of the same operating configuration in multiple cells 115 (i.e., if the bits in the acknowledgement message refer to the operating configuration indexes).

In another embodiment, the UE 105 may detect whether the correct number of commands have been correctly received. For example, the UE 105 may determine the number of commands transmitted by the access node 110 in the same PDCCH period by reading the size of the DCI. Alternatively, the UE 105 may determine the number of commands transmitted by the access node 110 in the same PDCCH period by reading a flag in the DCI indicating the amount of operating configurations carried by that DCI.

Figure 13:
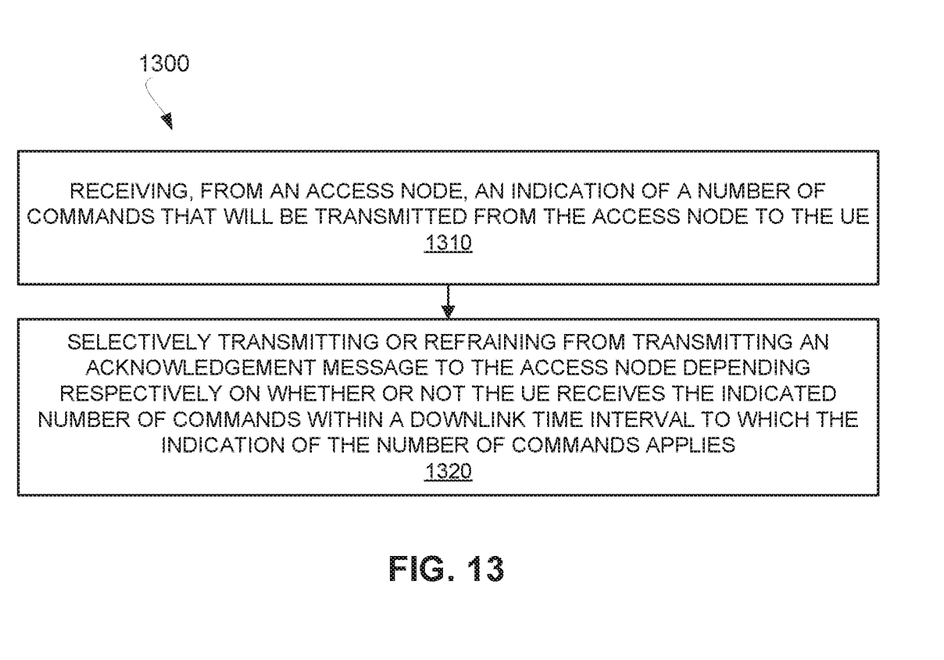
FIG. 13 is a flow diagram illustrating an additional example method, according to one or more embodiments of the present disclosure.

For example, one particular embodiment of the present disclosure includes the method 1300 illustrated in FIG. 13. The method 1300 is performed by a UE 105 configured for use in a wireless communication system 100. The method 1300 comprises receiving, from an access node 110, an indication of a number of commands that will be transmitted from the access node 110 to the UE 105 (block 1310). The method 1300 further comprises selectively transmitting or refraining from transmitting an acknowledgement message to the access node 110 depending respectively on whether or not the UE 105 receives the indicated number of commands within a downlink time interval to which the indication of the number of commands applies (block 1320).

In such embodiments in which the UE 105 determines the number of commands that should be received from the access node 110, the UE 105 may, e.g., trigger (and transmit) an acknowledgement message to the access node 110 when all of the indicated commands are correctly received, even in such cases when some bits are toggled (or changed) more than once (e.g., changed back to a previously reported state). Alternatively, responsive to one or more commands not being correctly detected/received, the UE 105 may refrain from transmitting the acknowledgement message. According to various embodiments, the indication of the number of commands may be received in DCI, RRC signaling, a MAC CE, or other signaling from the access node 110.

Figure 9:
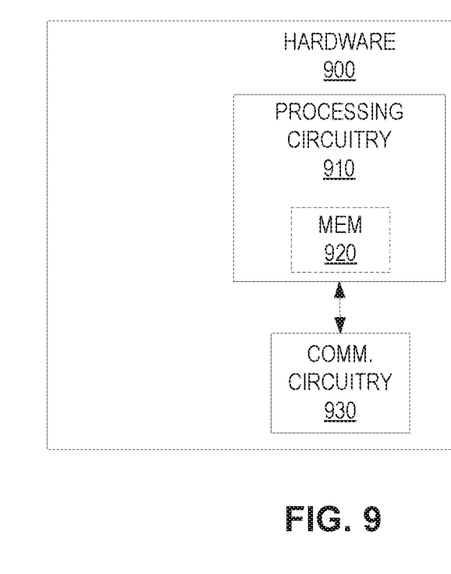
FIG. 9 is a block diagram illustrating example hardware, according to one or more embodiments of the present disclosure.

In view of all of the above, one or more of the devices and/or methods described above may be implemented using the example hardware 900 illustrated in FIG. 9. The example hardware 900 comprises processing circuitry 910 and communication circuitry 930. The processing circuitry 910 is communicatively coupled to the communication circuitry 930, e.g., via one or more buses. The processing circuitry 910 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 910 may be programmable hardware capable of executing software instructions stored as a machine-readable computer program in memory circuitry 920. The memory circuitry 920 of the various embodiments may comprise any non-transitory machine-readable media known in the art or that may be developed, whether volatile or non-volatile, including but not limited to one or more hardware registers, solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drives (e.g., magnetic hard disk drive), and/or any combination thereof.

The communication circuitry 930 may be a controller hub configured to control the input and output (I/O) data paths of the hardware 900. Such I/O data paths may include data paths for exchanging signals over a wireless communication network. For example, the communication circuitry 930 may comprise a transceiver configured to send and receive communication signals within and/or between the UE 105, the access node 110, and/or the network 100, e.g., over an air, electrical, and/or optical medium.

Although some embodiments of the communication circuitry 930 may be implemented as a unitary physical component, other embodiments of the communication circuitry 930 may be implemented as a plurality of physical components that are contiguously or separately arranged, any of which may be communicatively coupled to any other, and/or may communicate with any other via the processing circuitry 910. For example, in some embodiments, the communication circuitry 930 may comprise transmitter circuitry (not shown) configured to send communication signals, and receiver circuitry (not shown) configured to receive communication signals. According to particular embodiments, the hardware 900 illustrated in FIG. 9 may be configured with a plurality of components. These components may include a plurality of communicatively coupled hardware units and/or software modules. One or more of the hardware units may be, e.g., part of the processing circuitry 910. One or more of the software modules may be, e.g., stored in the memory circuitry 920 and executed by the processing circuitry 910.

Figure 10:
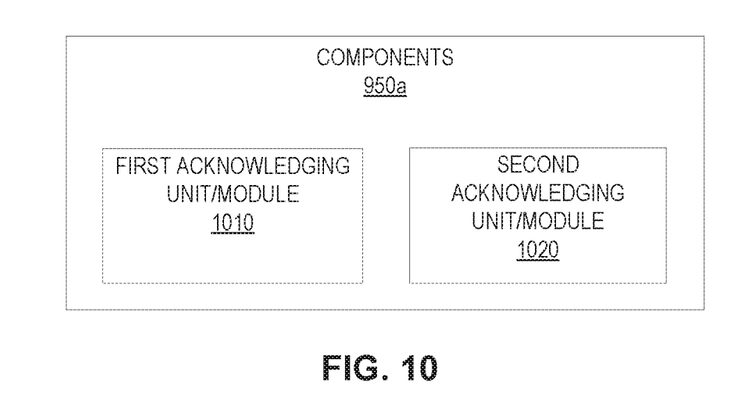
FIG. 10-12 are block diagrams, each of which illustrates example components, according to one or more embodiments of the present disclosure.

For example, the hardware 900 may be comprised in a UE 105 and configured with the example components 950a illustrated in FIG. 10. The components 950a include a first acknowledging unit or module 1010 and a second acknowledging unit or module 1020. The first acknowledging unit or module 1010 is configured to acknowledge one or more first commands received from an access node 110 by transmitting, to the access node 110, a first acknowledgment comprising a confirmation field set to a first value. The second acknowledging unit or module 1020 is configured to, after the first acknowledging unit or module 1010 acknowledges the one or more first commands, acknowledge one or more second commands received from the access node 110 by selectively transmitting or refraining from transmitting, to the access node 110, a second acknowledgement comprising the confirmation field set to a second value depending respectively on whether or not the second value would be different from the first value.

Figure 14:
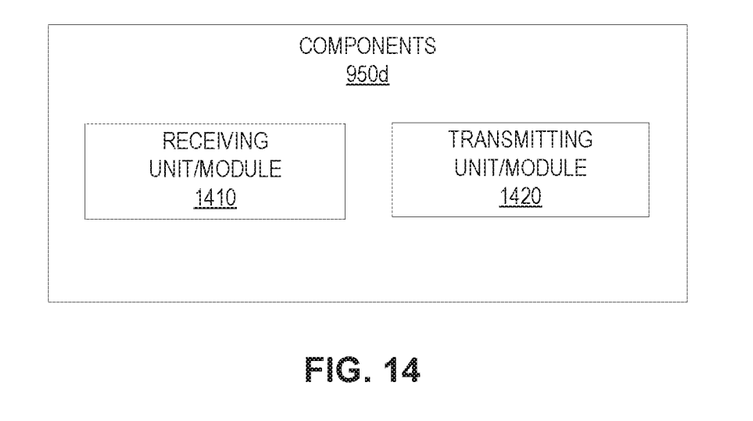
FIG. 14 is a block diagram illustrating further example components, according to one or more embodiments of the present disclosure.

The hardware 900, when comprised in the UE 105, may additionally or alternatively be configured with the example components 950d illustrated in FIG. 14. The components 950d include a receiving unit or module 1410 and a transmitting unit or module 1420. The receiving unit or module 1410 is configured to receive, from an access node 110, an indication of a number of commands that will be transmitted from the access node 110 to the UE 105. The transmitting unit or module 1420 is configured to selectively transmit or refrain from transmitting an acknowledgement message to the access node 110 depending respectively on whether or not the UE 105 receives the indicated number of commands within a downlink time interval to which the indication of the number of commands applies.

Figure 11:
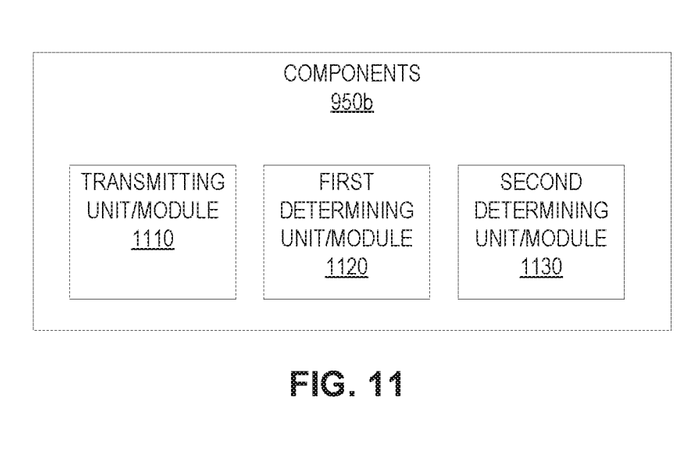

Alternatively, the hardware 900 may be comprised in an access node 110 and configured with the example components 950b illustrated in FIG. 11. The components 950b include a transmitting unit or module 1110, a first determining unit or module 1120, and a second determining unit or module 1130. The transmitting unit or module 1110 is configured to transmit, to a UE 105, one or more first commands and subsequently one or more second commands. The first determining unit or module 1120 is configured to determine that the UE 105 received the one or more first commands by receiving, from the UE, a first acknowledgement comprising a confirmation field set to a first value. The second determining unit or module 1130 is configured to determine that the UE 105 received the one or more second commands by receiving or not receiving, from the UE 105, a second acknowledgement comprising the confirmation field set to a second value depending respectively on whether or not the second value would be different from the first value.

Figure 12:
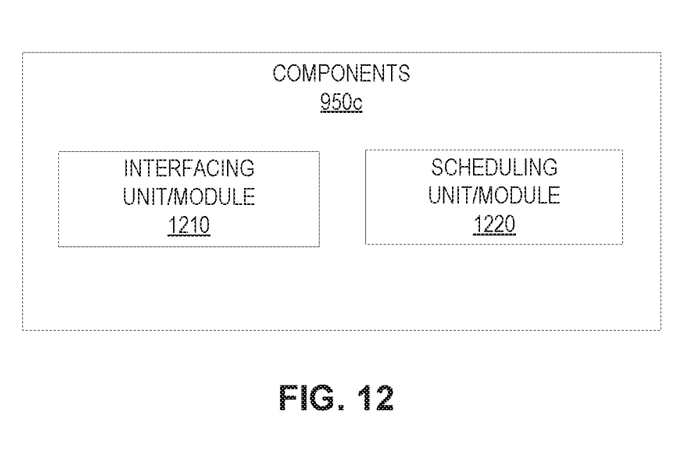

The hardware 900, when comprised in the access node 110, may additionally or alternatively be configured with the example components 950c illustrated in FIG. 12. The components 950c include a interfacing unit or module 1210 and a scheduling unit or module 1220. The interfacing unit or module 1210 is configured to transmit a first set of commands to a UE 105 and receive a first acknowledgement from the UE 105 in response. The first acknowledgement comprises a confirmation field set to a first value. The scheduling unit or module 1220 is configured to schedule transmission of a second set of commands to the UE 105 according to one or more rules that require the UE 105 to respond with a second acknowledgement comprising the confirmation field set to a second value that is different from the first value.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended enumerated embodiments are intended to be embraced therein.

The invention claimed is:

1. A method performed by a user equipment (UE) configured for use in a wireless communication system, the method comprising:
   acknowledging one or more first commands received from an access node by transmitting, to the access node, a first acknowledgment comprising a confirmation field set to a first value; and
   after acknowledging the one or more first commands, acknowledging one or more second commands received from the access node by selectively transmitting or refraining from transmitting, to the access node, a second acknowledgement comprising the confirmation field set to a second value depending respectively on whether or not the second value would be different from the first value.

2. The method of claim 1, wherein acknowledging the one or more first commands and acknowledging the one or more second commands is performed at respective acknowledgement transmission opportunities granted by the access node.

3. The method of claim 1, further comprising toggling one or more bits of the confirmation field responsive to receiving each of the first and second commands.

4. The method of claim 1, wherein at least one of the first and second commands is a command to activate or release an operating configuration specifying a set of transmission parameters for communication.

5. The method of claim 1, wherein:
   transmitting the first acknowledgement comprises transmitting the first acknowledgement with the confirmation field set to zero; and
   selectively transmitting or refraining from transmitting the second acknowledgement comprises transmitting the second acknowledgement with the confirmation field set to one.

6. The method of claim 1, wherein the confirmation field is a single bit field.

7. A method performed by an access node configured for use in a wireless communication system, the method comprising:
   transmitting a first set of commands to a user equipment, UE, and receiving a first acknowledgement from the UE in response, the first acknowledgement comprising a confirmation field set to a first value; and
   scheduling transmission of a second set of commands to the UE according to one or more rules that require the UE to respond with a second acknowledgement comprising the confirmation field set to a second value that is different from the first value,
   wherein at least one of the first and second commands is a command to activate or release an operating configuration specifying a set of transmission parameters for communication.

8. The method of claim 7, wherein the confirmation field is a single bit field.

9. The method of claim 7, wherein the first value is zero and the second value is one.

10. A user equipment (UE) configured for use in a wireless communication system, the UE comprising:
    a communication circuitry configured to exchange signals with the wireless communication system; and
    a processing circuitry communicatively coupled to the communication circuitry and configured to:
      acknowledge one or more first commands received from an access node by transmitting, to the access node, a first acknowledgment comprising a confirmation field set to a first value; and
      after acknowledging the one or more first commands, acknowledge one or more second commands received from the access node by selectively transmitting or refraining from transmitting, to the access node, a second acknowledgement comprising the confirmation field set to a second value depending respectively on whether or not the second value would be different from the first value.

11. The UE of claim 10, wherein the processing circuitry is configured to acknowledge the one or more first commands and acknowledge the one or more second commands at respective acknowledgement transmission opportunities granted by the access node.

12. The UE of claim 10, wherein the processing circuitry is further configured to toggle one or more bits of the confirmation field responsive to receiving each of the first and second commands.

13. The UE of claim 10, wherein at least one of the first and second commands is a command to activate or release an operating configuration specifying a set of transmission parameters for communication.

14. The UE of claim 10, wherein:
    to transmit the first acknowledgement the processing circuitry is configured to transmit the first acknowledgement with the confirmation field set to zero; and
    to selectively transmit or refrain from transmitting the second acknowledgement the processing circuitry is configured to select transmitting the second acknowledgement with the confirmation field set to one.

15. The UE of claim 10, wherein the confirmation field is a single bit field.

16. An access node configured for use in a wireless communication system, the access node comprising:
    communication circuitry configured to exchange signals with the wireless communication system;
    processing circuitry communicatively coupled to the communication circuitry and configured to:
      transmit a first set of commands to a user equipment, UE, and receiving a first acknowledgement from the UE in response, the first acknowledgement comprising a confirmation field set to a first value; and
      schedule transmission of a second set of commands to the UE according to one or more rules that require the UE to respond with a second acknowledgement comprising the confirmation field set to a second value that is different from the first value,
      wherein at least one of the first and second commands is a command to activate or release an operating configuration specifying a set of transmission parameters for communication.

17. The access node of claim 16, wherein the confirmation field is a single bit field.

18. The access node of claim 16, wherein the first value is zero and the second value is one.

* * * * *